(12) United States Patent
Granstrom

(10) Patent No.: US 7,248,446 B2
(45) Date of Patent: Jul. 24, 2007

(54) MAGNETORESISTIVE ELEMENT USING AN ORGANIC NONMAGNETIC LAYER

(75) Inventor: Eric L. Granstrom, Golden Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 807 days.

(21) Appl. No.: 10/306,384

(22) Filed: Nov. 27, 2002

(65) Prior Publication Data

US 2003/0112564 A1 Jun. 19, 2003

Related U.S. Application Data

(60) Provisional application No. 60/333,624, filed on Nov. 27, 2001.

(51) Int. Cl.
*G11B 5/31* (2006.01)

(52) U.S. Cl. .................................... 360/324.1

(58) Field of Classification Search ............ None
See application file for complete search history.

(56) References Cited

U.S. PATENT DOCUMENTS

| | | | | |
|---|---|---|---|---|
| 5,558,903 A * | 9/1996 | Bhushan et al. | ......... | 427/11 |
| 5,862,022 A | 1/1999 | Noguchi et al. | ......... | 362/113 |
| 5,936,293 A | 8/1999 | Parkin | ......... | 257/422 |
| 6,023,395 A | 2/2000 | Dill et al. | ......... | 360/113 |
| 6,040,962 A | 3/2000 | Kanazawa et al. | ......... | 360/113 |
| 6,043,510 A | 3/2000 | Kawamoto | ......... | 257/40 |
| 6,232,777 B1 | 5/2001 | Sato et al. | ......... | 324/252 |
| 6,312,840 B1 | 11/2001 | Kumagai et al. | ......... | 428/692 |
| 6,325,914 B1 | 12/2001 | Dediu et al. | ......... | 205/688 |
| 6,326,640 B1 | 12/2001 | Shi et al. | ......... | 257/40 |
| 6,330,137 B1 | 12/2001 | Knapp et al. | ......... | 360/324.2 |
| 6,411,478 B1 | 6/2002 | Mao et al. | ......... | 360/324.2 |
| 6,445,554 B1 | 9/2002 | Dong et al. | ......... | 360/324.2 |
| 6,452,204 B1 | 9/2002 | Ishiwata et al. | ......... | 257/9 |
| 6,456,523 B1 | 9/2002 | Tanaka et al. | ......... | 365/158 |
| 6,462,915 B1 | 10/2002 | Sasaki | ......... | 360/317 |
| 6,466,419 B1 | 10/2002 | Mao | ......... | 360/342.12 |
| 6,473,279 B2 | 10/2002 | Smith et al. | ......... | 360/324.12 |
| 6,586,069 B2 * | 7/2003 | Dykes et al. | ......... | 428/833.2 |
| 6,876,574 B2 * | 4/2005 | Giebeler et al. | ......... | 365/158 |
| 6,896,957 B1 | 5/2005 | Mayes et al. | | |
| 2005/0225905 A1 * | 10/2005 | Tera et al. | ......... | 360/324.2 |

OTHER PUBLICATIONS

Ku-Ding Tsuei et al., Photoemission and photoabsorption study of C60 absorption on Cu(111), Physical Review B, 52, No. 23, 1997.

* cited by examiner

*Primary Examiner*—Hoa T. Nguyen
*Assistant Examiner*—Mark Blouin
(74) *Attorney, Agent, or Firm*—Kinney & Lange, P.A.

(57) ABSTRACT

A magnetoresistive element has two magnetic layers and a nonmagnetic middle layer having organic molecules disposed between the two magnetic layers. The middle layer is thinner than 5 nm (50 Å). The magnetoresistive element exhibits a magnetoresistive effect as a function of the relative alignment of magnetizations of the first and the second magnetic layers and can be used in a magnetoresistive sensor in the based on GMR or TMR.

25 Claims, 3 Drawing Sheets

MAGNETORESISTIVE ELEMENT USING AN ORGANIC NONMAGNETIC LAYER

CROSS-REFERENCE TO RELATED APPLICATION(S)

This Application claims the priority benefit of Provisional U.S. Patent Application Ser. No. 60/333,624 entitled "ORGANIC SEMICONDUCTORS AS TUNNELING MAGNETORESISTANCE BARRIERS", filed on Nov. 27, 2001.

BACKGROUND OF THE INVENTION

The present invention relates to magnetoresistive devices. More specifically, the present invention relates to using a magnetoresistive element as a sensor in systems such as data storage systems.

A magnetoresistive (MR) element exhibits a change in electrical resistance as a function of external magnetic field. This property allows MR elements to be used as magnetic field sensors, read heads in magnetic storage systems, and magnetic random-access-memories. Depending on the structure of a device, the MR effect can fall into different categories, namely, anisotropic MR (AMR), giant MR (GMR), tunneling MR (TMR), and colossal MR (CMR). The early magnetoresistive devices, many currently still in production, utilize an AMR sensor. However, since an AMR sensor typically uses an AMR effect film such as NiFe, its magnetoresistive ratio and sensitivity are low. More recent magnetoresistive devices take advantage of the phenomena of GMR, TMR or CMR, which have come to light in recent years and attracted much research effort because these phenomena afford a greater MR ratio compared to the AMR effect.

While the AMR effect is generally due to an inherent magnetoresistive effect of a homogeneous material such as Fe or NiFe, the GMR, TMR and to a certain degree CMR effects are made possible by a spatial arrangement of several different materials. The GMR effect, for example, is achieved by utilizing a spin valve with a multilayer structure constituted of a nonmagnetic metallic layer sandwiched between two ferromagnetic layers. Such spin valves demonstrate characteristics of a high magnetoresistive ratio and high sensitivity with respect to the strength Oman external magnetic field. The GMR effect in such a structure is associated with a change in the relative alignment of the net spins on two ferromagnetic layers. When the net electron spins (or magnetization) on the adjacent ferromagnetic layers are in opposite directions, the resistance is high. When they are in the same direction, the resistance is low. Although an exact quantitative explanation for the GMR effect requires ab initio quantum mechanics calculations, a quite simple qualitative explanation is available. The electrical resistance of a metal arises from irregularities and discontinuities in the atomic lattice potential, called defects, as seen by the electrons. The defects cause electrical resistance by scattering electrons carrying a current. In a normal homogeneous conductive material such as a metal, both up-spin electrons and down-spin electrons travel in their own smooth lattice potential, resulting in low electrical resistance and high electrical conductance. In comparison, in the sandwiched multilayer structure previously described, the "smoothness" of the lattice potential seen by either up-spin electrons or down-spin electrons is disrupted by the nonmagnetic metallic layer in the middle because of a mismatch of the state densities of one of the spin polarizations between the nonmagnetic layer and the ferromagnetic layers. This can be illustrated in an exemplary case in which the ferromagnetic layers are cobalt and the nonmagnetic layer is copper. When spin polarizations in the two cobalt layers have the same direction, the up-spin electrons notice little difference in the number of electrons per atom as they travel from the cobalt layer to the copper layer. To these electrons the lattice potential is smooth or defect free. The electrical resistivity in this aligned case is thus low because up-spin electrons experience very little resistance and act like a short circuit, making the electrical resistance experienced by the down-spin electrons relatively irrelevant. When spin polarizations in the two ferromagnetic layers have opposite direction, however, both the up- and down-spin electrons experience an interrupted lattice potential at one of the interfaces because of a mismatch of the densities of electronic states between cobalt and copper, thus giving rise to a higher electrical resistance.

TMR is a generally similar phenomenon. The most elementary TMR system is obtained simply by replacing the metallic nonmagnetic spacer layer of a GMR sandwich configuration by an insulating layer (often called barrier layer). Unlike the GMR effect in which the spin polarization dependent magnetoresistance has to do with the conductive property of the middle layer, the TMR effect is caused by quantum tunneling through a very thin barrier layer which is an insulating material if observed as a bulk material. In the TMR phenomena, a tunneling magnetoresistive effect manifests depending upon the relative angles of magnetization of two ferromagnetic layers on two sides of a nonmagnetic insulating barrier layer in a multilayer junction similar to the sandwiched structure in GMR. The tunneling magnetoresistive effect is believed to be a result of the asymmetry in the density of states of the majority and minority energy bands in the ferromagnetic material. The resistance, which is inversely proportional to the spin-polarized tunneling probability, depends on the relative magnetization orientations of the two ferromagnetic layers on either side of the insulating barrier layer. In the parallel orientation there is a maximum match between the number of occupied states in one ferromagnetic layer and that of the available states in the other, resulting in a relatively higher tunneling probability. In the antiparallel configuration, the tunneling is between the majority states in one ferromagnetic layer and minority states in the other. This mismatch of the density states diminishes the tunneling probability. TMR often has a higher magnetoresistance ratio (signal ratio) than that of GMR, but more importantly an optimized TMR structure has proven to be able to provide extremely high degree of magnetic field sensitivity for small magnetic fields.

Both GMR and TMR have found important applications in various industries, primarily utilizing their ability to recognize an external magnetic field or a change thereof. A noted example of such applications is found in read heads of computer hard disc drives. However, the applications are by no means limited to computer hard disc drives. For example, using GMR or TMR, it is possible to make computer operating memories, such as random access memory (RAM), that are immune to power disruptions and ionizing radiation. GMR or TMR may also be used in motion sensors to increase the efficiency and safety of home appliances, automobiles, and factories. In principle, any motion that causes a change of the strength of a magnetic field can be detected by a sensor based on either GMR or TMR. Applications of this type of devices therefore may be widely used in the industrial, commercial, and military fields. Possible applications include sensitive detectors for wheel-shaft speed such as those employed in machine-speed controllers, automotive antilock brakes, and auto-traction systems; motion and position sensors for electrical safety devices; current transformers or sensors for measuring direct and alternating current, power, and phase; metal detectors and other security devices; magnetic switches in appliance controls, intrusion alarms, and proximity detectors; motor-flux monitors; level controllers; magnetic-stripe, ink, and tag readers; magnetic accelerometers and vibration probes; automotive engine control systems; highway traffic monitors; industrial counters; equipment interlocks; and many other applications requiring small, low-power, fast sensors of magnetic fields and flux changes. Furthermore, suitable film-deposition processes may also permit fabrication of GMR or TMR devices on electronic-circuit chips to produce highly integrated sensors at low cost and high volumes for mass industrial markets. Furthermore, magnetoelectronic devices such as field effect transistors (FETs) may be developed based on the magnetoresistive effect and these devices may someday complement or even replace some semiconductor electronic devices.

In storage systems, such as computer hard disc drives, the read head uses a magnetoresistive element. The read head is typically merged with a writer head. The writer writes encoded information to the magnetic storage medium, which is usually a disc coated with hard magnetic films. In a read mode, a magnetic bit on the disc modulates the resistance of the MR element as the bit passes below the read head. As drive storage areal density increases, GMR or TMR read sensors using a magnetoresistive element become increasingly important. The digital information (bits of 1 or 0) is stored as the direction of the magnetization of small regions on the disc. The information is read by sensing the magnetic fields just above these magnetized regions on the disc. As the areal density becomes higher, the regions become smaller, and the fields that must be sensed to read the data become weaker. Read sensors that employ the GMR or TMR effect provide the best technology currently available for detecting the fields from these tiny regions of magnetization. These very small sensors detect a very small magnetic field that causes a detectable change in resistivity in the sensor due to the magnetoresistive effect. The detected changes in the resistivity produce electrical signals corresponding to the data on the disc. The electric signals are then sent to the computer to be processed.

The GMR element favored by the data storage industry is the spin valve. It consists of a free ferromagnetic layer which rotates with the external field, a conductive spacer, and a pinned ferromagnetic layer which has a magnetization fixed along one direction. The electrical resistance of a spin valve is a function of the angle between the magnetization in the free layer and the pinned layer. A GMR sensor is the most resistive when the two layers are magnetized in anti-parallel directions, and is the most conductive when they are parallel. Most hard disc makers have completed the transition from making AMR heads to making GMR heads. The technology may work for areal densities up to 100 G bit/inch$^2$, beyond which point the sensitivity again becomes an issue.

TMR devices offer a possible solution to achieve even higher areal densities. Compared to GMR devices, TMR devices usually have greater output signals and are also more sensitive to small external magnetic fields. TMR read heads in computer hard disc drives have been disclosed, for example, in U.S. Pat. No. 5,390,061; and U.S. Pat. Nos. 5,729,410, 5,898,547, 5,898,548, and 5,901,018.

A common TMR element used in read heads of hard disc drives is a TMR junction very similar to a spin valve in the sense that it also consists of a free layer, a middle layer, and a pinned layer (often called reference layer). The magnetoresistance arises from the angular difference between the magnetization in the two magnetic layers in a way analogous to a spin valve. A major difference between a TMR junction and a GMR based spin valve is that the middle layer in a TMR junction, commonly called a barrier layer, is made of an insulator, typically aluminum oxide, instead of a conductor. Moreover, in typical TMR sensors the electrical current is perpendicular to the plane (CPP) of the films as opposed to current in the plane (CIP) for GMR sensors. Consequently, TMR junctions require a top and a bottom electrode to the junction stack in order to measure the electrical property.

A GMR element and a TMR element as described above both use a middle layer sandwiched between two magnetic layers. The middle layer used in these conventional magnetoresistive elements is called "spacer" when the element is based on the GMR effect and "barrier" when the element is based on the TMR effect. Conventionally, the engineering designs for GMR based magnetoresistive elements and TMR based magnetoresistive elements took different approaches as far as the selection of the material and structural designs for the middle layer (spacer or barrier, respectively) is concerned. Specifically, metallic materials are used for spacers, while insulators are used for barriers. In either case, however, inorganic material has been used for the middle layer (spacer or barrier). Although organic materials have been suggested for making an active element in a magnetoelectronic device to transport spin-polarized electrons (see U.S. Pat. No. 6,325,914), there has been no suggestion to use an organic material to make a passive spacer or barrier in a GMR or TMR element. An active element used to transport electrons in a magnetoelectronic device is a relatively thick material, requiring a thickness greater than 50 nm (500 Å) to ensure the electrical continuity of the material. In contrast, a passive spacer or barrier in a GMR or TMR element generally has a thickness less than 5 nm (50 Å).

Due to the importance of a basic magnetoresistive element used in various magnetoresistance devices, there is a need for new designs for such a magnetoresistive element that is smaller, more manageable in fabrication, and exhibits more reliable, more predictable and more sensitive magnetoresistive effect. Factors that contribute to the above characteristics include the chemical properties, the physical properties and the thickness of the barrier layer. For example, the use of a TMR element in computer hard disc read heads may allow for increased magnetoresistance signal for high areal density heads, but the application is limited in part by the characteristics of high resistance of the barrier layers. The prior attempts to minimize the resistance of the barrier layers typically include reducing barrier layer thickness. The existing read sensor designs have included insulating barrier layers formed of insulating oxides such as alumina. Alumina insulating barrier layers can be formed by known methods, including deposition of aluminum metal by physical vapor deposition, evaporation, or ion beam deposition. After such deposition, the aluminum can then be oxidized in $O_2$ plasma or by simple, controlled exposure to $O_2$. Such processes can result in an alumina layer having a thickness T in the range of about 10 Å to about 50 Å, and an effective tunneling barrier for electrons in the range of about 1 eV to about 5 eV. Empirically, a lower effective tunneling barrier for electrons is at least partially due to a lower band gap of the barrier layer material used, where the band gap is a measure of the separation between the energy of the lowest conduction band and the highest valence band. While such thicknesses and band gap values may be adequate, unfortunately these processes and materials result in significant defects such as pinholes, and therefore significant probability of shorting. Using conventional materials and conventional methods, the thinner the barrier layer becomes, the more likely the resultant barrier layer contains pinholes and other defects.

At the same time, existing barrier layer configurations are limited by the minimum thickness possible without suffering magnetic coupling between reference and free layers. Specifically, the thinner the barrier layer is, the closer the reference and free layers are to each other, and the more likely magnetic coupling between the reference and free layers becomes. Severe coupling may render the read head ineffective for detecting external magnetic field signals.

Inorganic barrier layers having a band gap smaller than that of alumina have been proposed as a means of reducing the barrier layer's electrical resistance. U.S. Pat. No. 6,330,137 to Knapp et al. discloses a magnetoresistive device that includes an insulating barrier layer formed of diamond like carbon (DLC) such as tetrahedral amorphous carbon. The use of tetrahedral amorphous carbon is said to be more defect free than other prior art insulation barrier layers while maintaining at least comparable band gap values and thicknesses. But such applications are limited to amorphous carbon materials, and the number of such materials is limited.

Furthermore, as the thickness of the barrier layer reaches within the range of nanometers, the physical and chemical properties of the barrier layer can no longer be predicted based on its bulk material properties. This ostensible obstacle is actually a blessing that leads to a new dimension of engineering designs at the molecular level. In this regard, conventional materials used in TMR as a conventional barrier layer has limited amount of manipulability and limits the freedom for engineering designs at the molecular level.

BRIEF SUMMARY OF THE INVENTION

The present invention is a magnetoresistive element comprising a first magnetic layer, a second magnetic layer, and a middle layer disposed between the first and the second magnetic layers. The middle layer is thinner than 5 nm (50 Å) and comprises organic molecules. The magnetoresistive element exhibits a magnetoresistive effect as a function of the relative alignment of magnetizations of the first and the second magnetic layers.

In one embodiment of the present invention, the middle layer is a molecular monolayer. In another preferred embodiment of the present invention, the organic molecules are semiconductive.

In another embodiment, the organic molecules are substantially uniformly distributed across the middle layer, and the magnetoresistive element exhibits substantially uniform magnetoresistive effect across the middle layer.

The present invention is also a method to design a magnetoresistive element that exhibits optimized characteristics. The method comprises setting a target property or a combination of target properties of the magnetoresistive element, selecting a material comprising organic molecules, and derivatizing the organic molecules such that the derivatized organic molecules, when used to form the layer, demonstrate the target property or the combination of target properties.

The magnetoresistive element in accordance with the present invention may be based on either the GMR effect or the TMR effect, or a combination of both. In addition, although the magnetoresistive element in accordance with the present invention is preferably used as a read head in a computer hard disc, it may also be used in various other magnetoresistive devices such as a sensor to sense an external magnetic field.

DETAILED DESCRIPTION

The present invention is described in detail with reference to drawings (FIGS. 1-7), in which like numerals indicate like components throughout the several views.

Figure 1:
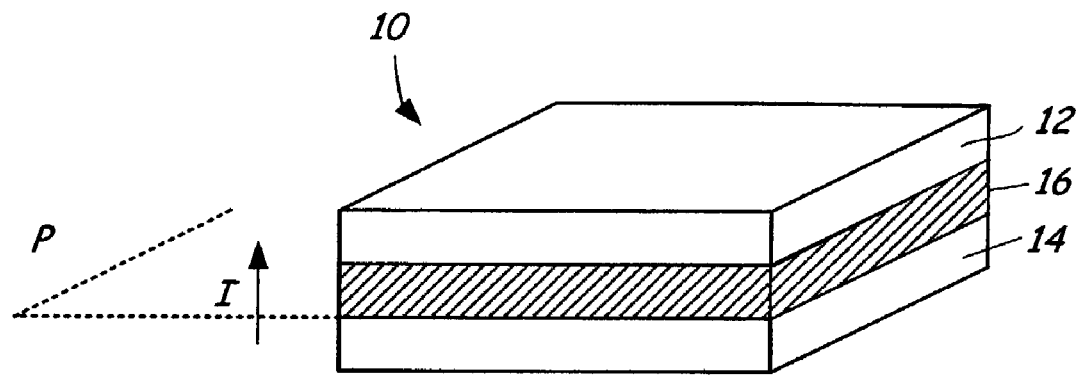
FIG. 1 is a diagrammatic illustration of a basic magnetoresistive element in accordance with the present invention.

FIG. 1 is a diagrammatic illustration of a basic magnetoresistive element 10 in accordance with the present invention. Magnetoresistive element 10 includes magnetic layer 12, magnetic layer 14 and middle layer 16. Middle layer is disposed between magnetic layers 12 and 14. Middle layer 16 is nonmagnetic and includes an organic material having organic molecules (individual molecules not shown). For the types of applications envisioned by the present invention, middle layer 16 preferably has a thickness T smaller than 5 nm (50 Å), or even smaller than 2 nm (20 Å). Magnetoresistive element 10 exhibits a magnetoresistive effect when the relative alignment of magnetizations of magnetic layers 12 and 14 varies. Specifically, magnetoresistive element 10 exhibits a variable electrical resistance which is determined by the relative alignment between the magnetizations of magnetic layers 12 and 14. The variable electrical resistance is sensed by an auxiliary circuitry (not shown) by using a sense current applied across two different regions of magnetoresistive element 10. It is well-known in the art that the sense current can be either used current-in-plane (CIP) or current-perpendicular-to-plane (CPP). In the CPP mode, for example, middle layer 16 defines plane P and a sense current flows transverse plane P in the direction denoted by arrow I. Because the relative alignment between the magnetizations of magnetic layers 12 and 14 may be influenced by the existence of an external magnetic field, magnetoresistive element 10 can be used as an element of a sensor for sensing the existence of such an external magnetic field. A noted example of such applications is using magnetoresistive element 10 as an sensing element in a magnetic read head of a data storage device such as a disc drive. The basic modes of such applications are well-known in the art and will not be further described in detail in this application.

The principal feature of the magnetoresistive element 10 according to the present invention is use of an organic material in middle layers 16. The resultant magnetoresistive element 10 itself may be based on the GMR effect, the TMR effect, or a combination thereof.

An organic material in the meaning of the present application refers to a material that is at least partially made of organic molecules. The term "organic molecule" as used in the present application is defined to include all carbon-based molecules regardless of whether the molecule includes another chemical element such as hydrogen or oxygen. Organic molecules in accordance with the present invention, therefore, not only include traditional organic compounds as normally defined in organic chemistry, but also include carbon-based molecules such as buckminsterfullerene ($C_{60}$) or other fullerenes. Organic molecules in accordance with the present invention, however, do not include forms of pure carbon elements that do not exist as individual molecules but rather as networks of carbon atoms, such as diamond, graphite, or amorphous diamond like carbon (DLC) materials. As understood in conventional chemistry, a molecule is a definite number of atoms connected to each other through chemical bonding such as covalent bonding or ionic bonding, and is a small repetitive motif of a compound. A molecule thus does not include a group of an arbitrary number of networked atoms, or groups of atoms that interact with physical interactions such as van der Waals bonding or relatively weaker charge-transfer binding.

Several advantages are expected in using a molecular organic middle layer. First, many organic molecules demonstrate self-assembly properties during which individual molecules tend to find their nearest neighbors and assemble together due to the inherent intermolecular interactions. Due to self-assembly, the thickness of organic middle layer 16 can be controlled to offer substantial improvements in uniformity over traditional inorganic middle layers. Conventional inorganic middle layers (e.g., TMR barriers) require difficult, high precision control over the thickness of a thin film. In contrast, organic layers as disclosed in this application, owing to the relative ease in forming ordered layers, are much more amenable to deposition in controlled monolayer or multilayer thickness.

Second, a much larger and more controllable range of various chemical and physical properties is available from organic molecules than inorganic molecules. For example, as further discussed herein, a wide range of organic molecular semiconductors become available for making an improved magnetoresistive element. Unlike inorganic semiconductors, many organic molecules semiconductors may have both low resistance and facile manufacturability. These organic semiconductors also have the advantage of requiring less stringent processing conditions and lower costs for production. For another example, organic molecules having a suitable size and exhibiting a substantially isotropic electron transport property are available to provide a less process-dependent magnetoresistive effect in the resultant magnetoresistive element.

In addition, the electrical properties of the middle layer may be readily modified by changing the chemical structure of the organic molecules in a way that is traditionally not possible for inorganic molecules. One of the important means for such modifications of organic molecules is derivatization in which groups or subgroups in an organic molecule are removed or replaced by a different group or subgroup. Using such modifications, an organic molecule having desired properties such as the three-dimensional size of the molecule, electrical interactions with other materials, and electron transport properties, may be engineered or selected. A change in molecular length, for instance, allows for direct control of thickness T of middle layer 16. A change in groups or subgroups may allow for similar control over band gap values and band gap symmetry of the organic molecules. The above advantages of using organic molecules in middle layer 16 thus address some of the primary limitations in conventional magnetoresistive elements. The manufacture of read heads based on TMR for data storage applications, for example, is primarily limited by the high electrical resistance of barrier layers and high non-uniformity in that resistance. Use of an organic middle layer 16 as the barrier layer in a TMR magnetoresistive element and appropriate processing thereof addresses both of the above limitations.

Middle layer 16 may be an organic insulator to function as a barrier layer. The resultant magnetoresistive element 10 is thus similar to conventional TMR sensor but with the advantages of using an organic material as discussed above. Exemplary conventional TMR sensors used in read heads of storage systems can be found in the following United States patents which are herein incorporated by reference in their entirety: U.S. Pat. No. 6,411,478, U.S. Pat. No. 6,330,137 and U.S. Pat. No. 5,936,293.

Middle layer 16 may be an organic conductor to function as a spacer layer. The resultant magnetoresistive element 10 is thus similar to conventional GMR sensor but with the advantages of using an organic material as discussed above. Exemplary conventional GMR sensors used in read heads of storage systems can be found in U.S. Pat. No. 6,232,777 and the U.S. Pat. No. 6,445,554, which are herein incorporated by reference in their entirety.

Furthermore, middle layers 16 may be an organic semiconductor to function as either a spacer layer or a barrier layer, or a combination of both. The resultant magnetoresistive element is accordingly similar to either a conventional GMR sensor or conventional TMR sensor, or a combination of both. Although usually described as two different phenomena and designed by using different engineering approaches, GMR and TMR are actually fundamentally related and both relate to scattering of electron waves and particles in spin polarized state density junctions. From an end user's point of view of a magnetoresistive sensor, it is not critical to differentiate a magnetoresistive effect caused by GMR from a magnetoresistive effect caused by TMR. Accordingly, it may not be necessary to strictly design middle layer 16 as either a conductive spacer or an insulating barrier. In this sense, using an organic semiconductor material in middle layer 16 provides further designing freedom for magnetoresistive element 10.

Figure 2:
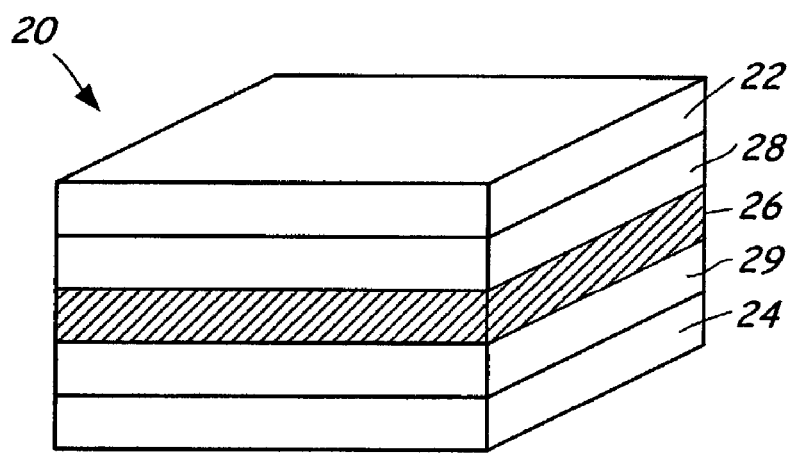
FIG. 2 is a diagrammatic illustration of another magnetoresistive element in accordance with the present invention in which a middle layer is disposed in between two magnetic layers but separated therefrom by accessory layers.

FIG. 2 is a diagrammatic illustration of magnetoresistive element 20 in which middle layer 26 is disposed in between magnetic layers 22 and 24 but separated therefrom by accessory layers 28 and 29. This configuration provides additional designing flexibility. For example, middle layer 26 may be either insulating or semiconductive while accessory layers 28 and 29 are conductive. This design allows additional spacing between two opposing magnetic layers 22 and 24 without increasing electrical resistance therebetween. Such additional spacing may be necessary to avoid magnetic coupling between magnetic layers 22 and 24.

Furthermore, since magnetoresistive element 10 (FIG. 1) or 20 (FIG. 2) in accordance with the present invention is a basic element used in a magnetoresistive sensor, an actual magnetoresistive sensor may contain more than one magnetoresistive element 10 or 20, as illustrated below.

Figure 3:
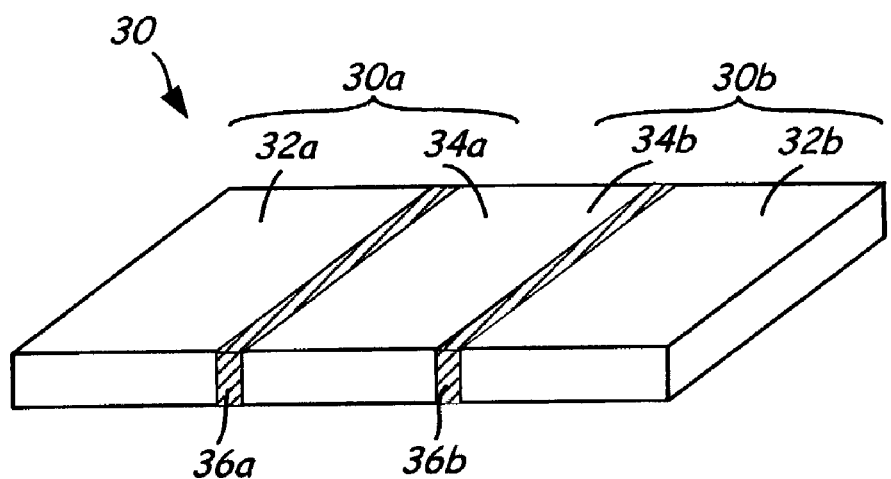
FIG. 3 is a diagrammatic illustration of a combinatory magnetoresistive element having two magnetoresistive elements in accordance with the present invention.

FIG. 3 is a diagrammatic illustration of a combinatory magnetoresistive element 30 which has two magnetoresistive elements 30a and 30b. Each of magnetoresistive elements 30a and 30b is similar to magnetoresistive element 10 or 20 illustrated in FIGS. 1 and 2, respectively. Specifically, magnetoresistive element 30a has magnetic layers 32a and 34a, and middle layer 36a disposed therebetween. Magnetoresistive element 30b has magnetic layers 32b and 32b, and middle layer 36b disposed therebetween. Magnetic layers 34a and 34b may be either portions of the same layer or two different layers abutting each other. Combinatory magnetoresistive element 30 is similar to that disclosed in U.S. Pat. No. 6,411,478 but with additional advantages of using an organic material to make middle layers 36a and 36b. The two-junction design in that patent allows a compact CIP tunnel junction stack.

Figure 4:
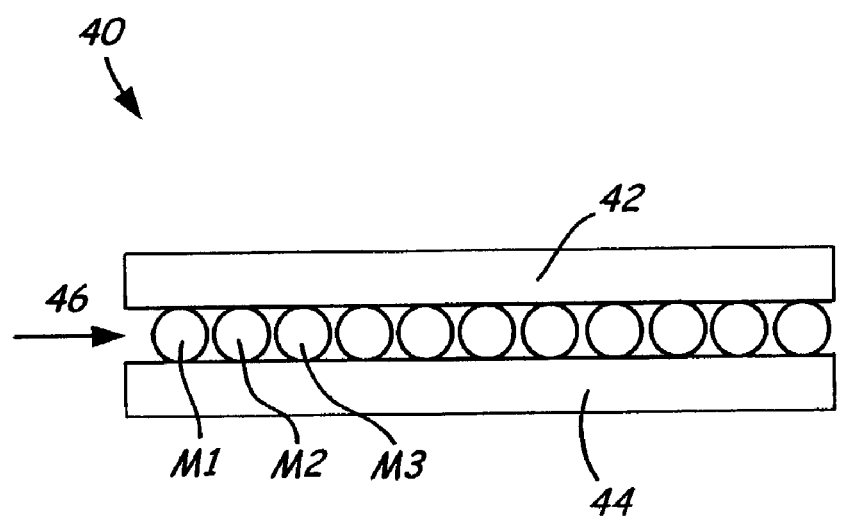
FIG. 4 illustrates a magnetoresistive element having a molecular monolayer as a middle layer.

FIG. 4 illustrates magnetoresistive element 40 which has molecular monolayer 46 as a middle layer disposed between magnetic layers 42 and 44. Molecular monolayer 46 is a single layer of molecules including at least some organic molecules denoted as M1, M2, M3, . . . etc. Organic molecules M1, M2, M3, . . . etc. may be that of different organic compounds and further mixed on the same molecular monolayer 46 with other molecules (not shown) which are either organic or inorganic. Preferably, however, organic molecules M1, M2, M3, . . . etc. on molecular monolayer 46 are identical molecules of the same organic compound and are substantially evenly distributed over molecular monolayer 46 in order to achieve uniform magnetoresistive effect across magnetoresistive element 40. In the simplest embodiment, molecular monolayer 46 substantially consists of identical molecules M1, M2, M3, . . . etc. only. Furthermore, in order to reduce pinholes on molecular monolayer 46 and thus avoid short-through between magnetic layers 42 and 44, molecular monolayer 46 preferably has a tightly-packed arrangement in which adjacent molecules are substantially in close contact with each other. As known in the art, due to their self-assembly characteristics, many organic molecules tend to form a tightly-packed molecular monolayer relatively easily.

Molecular monolayer 46 as shown in FIG. 4 has direct contact with magnetic layers 42 and 44. The chemical and physical nature of such contact varies according to many factors including: 1) the type of molecules that form molecular monolayer 46; 2) the type of the materials that form magnetic layers 42 and 44; and 3) the exact conditions and process to form molecular monolayer 46. Generally, the contact between molecular monolayer 46 and magnetic layer 42 or 44 can be characterized as one of the following, in a decreasing order of contact strength: covalent chemical bond, weaker charge transfer bond and van der Waals bond. When a covalent chemical bond or a charge-transfer is formed between molecular monolayer 46 and magnetic layer 42 or 44, the chemical or physical properties of the molecules in molecular monolayer 46 may become different from their inherent properties when observed as a pure compound. For example, an electrically insulating molecule may become conductive or semiconductive when it forms such strong bonds with magnetic layer 42 or 44. Conductivity of a molecule relates to the band gap between the lowest energy states of the conduction band and the highest energy states of the valence band. Strong bonding with other molecules changes the conductivity of the molecule by changing its band gap. In this sense, the electronic properties of a monolayer can be refined by making a specific type of contact with an adjacent layer such as magnetic layer 42 and/or 44 in FIG. 4. This transformation of properties provides another dimension of freedom in designing magnetoresistive element 40. The above-described transformation does not always occur, however. In a simplest form, the organic molecules may retain their intrinsic conductivity (such as a semiconductor) in contact with the magnetic layers.

In addition, due to their relatively more complex structures, varying organic molecules tend to result in different band gaps and electronic band structures, providing more freedom of adjusting band alignment between the middle layer 46 and the adjoining magnetic layer(s) 42 and/or 44 and conducting behavior of magnetoresistive element 40.

In one embodiment, an organic molecular semiconductor such as buckminsterfullerene ($C_{60}$) is used to form a monolayer 46. The molecule of $C_{60}$ has an electronic band gap of 1.8 eV, which is substantially lower than the 8.8 eV in $Al_2O_3$ used in the conventional barrier layer in TMR based magnetoresistive elements. Empirically, a lower band gap of the barrier layer material results in a lower effective tunneling barrier for electrons. The lower band gap of $C_{60}$ thus leads to a lower barrier height and a lower junction resistance, yet not so low as to allow thermal excitations to degrade the TMR signal. In addition, the electron transport properties of $C_{60}$ is substantially isotropic and as a result the electrical conductivity of a $C_{60}$ layer is independent of the orientation of the $C_{60}$ molecules deposited on a substrate.

Figure 5:
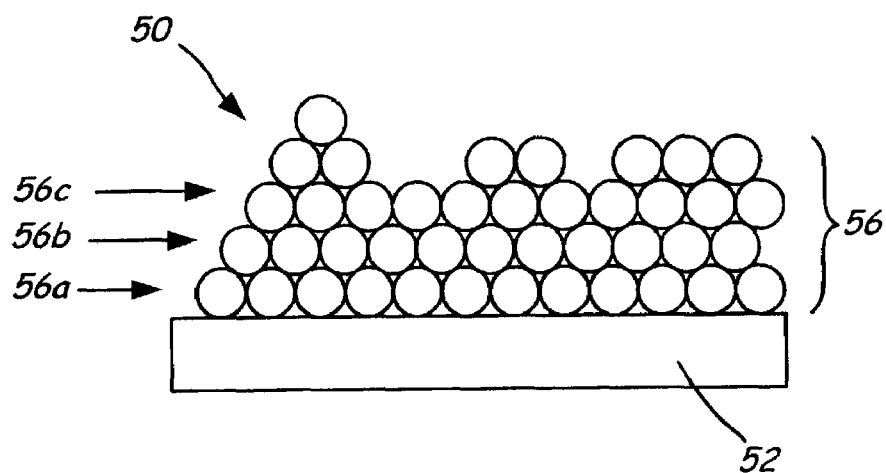
FIGS. 5 and 6 show an exemplary process of forming a monolayer such as monolayer in FIG. 4.
Figure 6:
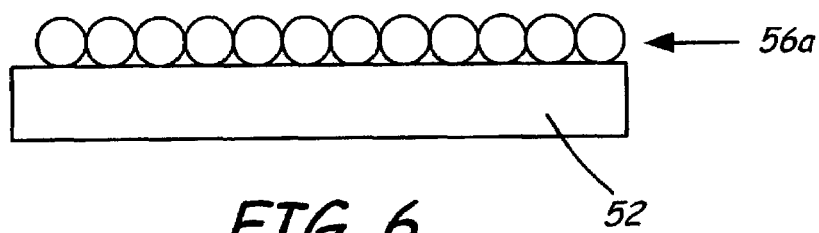

FIGS. 5 and 6 show an exemplary process of forming a molecular monolayer such as monolayer 46 in FIG. 4. In FIG. 5, a coated structure 50 has substrate layer 52, and an interim thick film 56 of $C_{60}$ molecules formed on substrate layer 52 by a conventional thermal evaporation technique. The interim film 56 has a first molecular layer 56a in direct contact with substrate layer 52, second molecular layer 56b on top of first molecular layer 56a, and additional molecular layers on top of second molecular layer 56b. The first molecular layer 56a engages in a relatively strong charge-transfer bond with substrate layer 52, while subsequent molecular layers (56b, etc.) have only weak van Der Waals bonding to each other. Coated structure 50 is then heated to approximately 500° K. As a result of heating, weakly bound layers desorb from the substrate, leaving only a residual, tightlybound monolayer 56a on substrate 52 as shown in FIG. 6. Through this process, formation of a precise monolayer 56a achieved. Due to the self-assembly property of $C_{60}$ molecules, monolayer 56a tends to have tight packing, thus preventing pinhole formation.

Depending on the actual configuration and application, substrate layer 52 may or may not be a magnetic layer such as magnetic layer 42 illustrated in FIG. 4. Specifically, there may be an intervening layer(s) between middle layer 46 and magnetic layer 42 in FIG. 4. In such a configuration, substrate layer 52 in FIG. 6 would be such an intervening layer between monolayer 46 and a magnetic layer. Similarly, a top magnetic layer (not shown in FIG. 5 and FIG. 6) may be formed over monolayer 46, either in direct contact with monolayer 46, or spaced therefrom by an intervening layer. Although the process illustrated in FIGS. 5 and 6 is preferably used for forming a monolayer 46, it may also be used to form a molecular multilayer by removing extraneous molecules on top of the molecular multilayer.

In the above-described embodiment, the semiconductor nature of $C_{60}$ is intrinsic to the molecule. Compared to inorganic semiconductors, the semiconductivity of $C_{60}$ is thus only weakly perturbed by deposition conditions and surface conditions.

Figure 7:
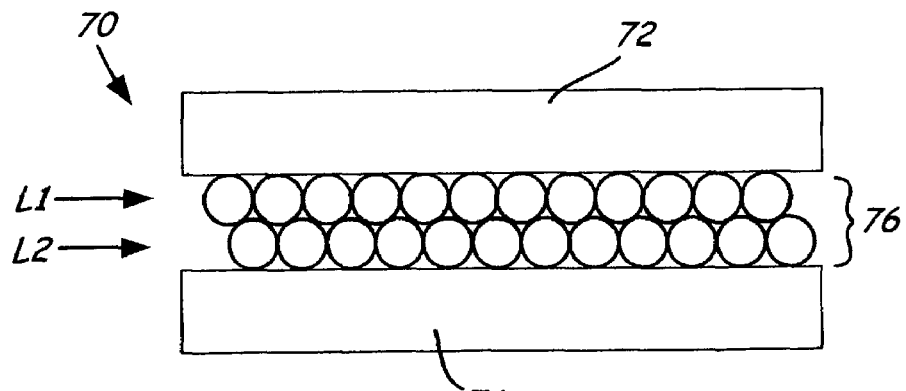
FIG. 7 illustrates a magnetoresistive element which has molecular multilayer as a middle layer.

FIG. 7 illustrates magnetoresistive element 70 which has molecular multilayer 76 as a middle layer disposed between magnetic layers 72 and 74. Molecular multilayer 76 as shown has exemplary two layers (L1 and L2) of molecules, but may have more than two layers of molecules. At least one of L1 and L2 layers has organic molecules. For clarity, individual molecules are not denoted in FIG. 7. Similar to that in FIG. 4, organic molecules may be that of different organic compounds and further mixed within the same molecular multilayer 76 with other molecules which are either organic or inorganic. But preferably organic molecules on each layer L1 or L2 of molecular multilayer 76 are identical molecules of the same organic compound and are substantially evenly distributed over that layer in order to achieve uniform magnetoresistive effect across magnetoresistive element 70. In a simple embodiment, layer L1 substantially consists of identical organic molecules only, while layer L2 has molecules that are different from organic molecules of layer L1. In another simple embodiment, both layers L1 and L2 substantially consist of identical organic molecules only.

Compared to molecular monolayer 46 in FIG. 4, molecular multilayer 76 provides another degree of freedom in designing magnetoresistive element 70. On one hand, as compared to prior art designs which use a bulk material for the middle layer and have no meaningful control over the formation of individual layers of molecules, magnetoresistive element 70 in FIG. 7 has advantages of both using organic molecules and using a multilayer in which the composition and formation may be controlled for each individual layer. For example, one layer (e.g., layer L1) may be designed to provide desirable electron transport properties while another layer (e.g., layer L2) may be designed to reduce the pinhole density and to avoid short-through between magnetic layers 72 and 74. For another example, different molecular layers (e.g., L1 and L2) may have different molecular compositions of different properties such as different band gaps. Here, two molecules layers having different molecular compositions means that a second molecular layer comprises at least one type of molecules that are not found in a first molecular layer. Using such compositional variation among molecular layers (L1 and L2), electron transport properties can be further tuned, band gap(s) of the organic molecules on a molecular layer (L1 or L2) may be specifically matched to corresponding contacting magnetic layer (72 or 74, respectively), and magnetic coupling between the two opposing magnetic layers 72 and 74 may be better controlled.

It should be noted that the magnetoresistive element (10, 20, 30, 40 or 70) in accordance with the present invention constitutes a basic element used in a magnetoresistive sensor. Additional components, either of the same or different materials, may be used together with the basic element (10, 20, 30, 40 or 70) to constitute a functional sensor. When a magnetoresistive element in accordance with the present invention is used in a magnetoresistive read head of a storage system, for example, one of the magnetic layers typically is a reference layer or pinned layer having a fixed orientation of magnetization, and the other magnetic layer is a free layer or sensing layer having an orientation of magnetization which varies in accordance with an external magnetic signal from a data storage medium used in a data storage. In such an application, additional components such as pinning layers, seed layers, shielding layers, gaps, caps and leads are necessary to make a magnetoresistive stack in a fully functional read head. Given a basic magnetoresistive element such as magnetoresistive element 10 in accordance with the present invention, however, a fully functional magnetoresistive sensor may be designed and fabricated using any of existing methods known in the art. Furthermore, as discussed previously, particularly with reference to FIG. 2, middle layer 16 may itself include several layers.

The use of organic molecules in the middle layer (16, 26, 36a, 36b, 46 or 76) leads to a distinctive method of designing an optimized magnetoresistive element having a first magnetic layer, a second magnetic layer, and a middle layer sandwiched between the first and second magnetic layers. The method includes the following steps:

1) Set a target property or a combination of target properties of the magnetoresistive element. Exemplary target properties or the combination of target properties include but are not limited to: a middle layer having a certain desired level of electrical resistance, a bond having a specific range of bond strength between the middle layer and at least one of the first and second magnetic layers; a specific range of thickness of the middle layer; a specific range of pinhole density on the middle layer; and a specific range of tunneling channel density on the middle layer. The specific range of a target property is determined by the intended function of the magnetoresistive element. For example, when used in a read head of a hard disc drive, the thickness of the middle layer may range from 8 Å to 50 Å, and the desired pinhole density may be less than 1 per 10,000 nm$^2$.

It should be noted that the design method may be applied with respect to a target property of one or several specific single molecular layers (e.g, L1 or L2 in FIG. 7) contained in a middle layer in accordance with the present invention, rather than that of the entire middle layer. That is, in a middle layer that has multiple molecular layers, each molecular layer may be individually selected and designed according to the design method.

2) Select a material comprising organic molecules. The selected organic material is used as a starting point for designing an optimized middle layer of a final magnetoresistive element. This initial selection may be made based on past experience, general scientific knowledge, or results of specific experiments.

3) Derivatize the organic molecules such that the derivatized organic molecules, when used to form the middle layer, demonstrate the target property or the combination of target properties.

In one embodiment of the above method, the selected organic molecules have a phenol group between two opposing thiol-capped alkyl chains. Derivatizing such molecules by changing the bonding of thiol-capped alkyl chains from sp3 hybridized orbitals to sp2 hybridized orbitals allows for conjugation, and thus a greater relative conductance through the derivatized molecules.

In another embodiment, derivatizing selected organic molecules by a conventional derivatizing methods such as replacing, removing or adding an organic group or subgroup in the molecules achieves desirable sizes of the organic molecules used in the middle layer, which sizes in turn allow adjustment of the thickness of the middle layer having a certain number of molecular layers (i.e., a monolayer) containing the derivatized organic molecules. For instance, if the selected organic molecules have alkyl chains between thiol and phenol groups composed of two carbon units per end group, adding an additional carbon unit will increase the overall size of the derivatized organic molecule and thus increase the thickness the middle layer having a certain number of layers of the derivatized organic molecules.

In another embodiment, pinhole density of the middle layer having a certain number of molecular layers (e.g., a monolayer) is fine-tuned or adjusted by derivatizing organic molecules to have better self-assembly abilities. For instance, if the selected organic molecules have alkyl chains between a phenol group and a thiol group, use of longer alkyl chains (e.g., increasing the number of carbon units between the phenol group and the thiol group on each side from three to four, tend to decrease the pin-hole density.

In yet another embodiment, the tunneling channel density on the middle layer is adjusted by delivatizing selected organic molecules. When a molecular layer(s) (e.g., 46 in FIG. 4 or 76 in FIG. 7) is used as the middle layer, the tunneling channel density is determined by the molecule density on the molecular layer(s). Because the molecule density of a self-assembled layer of organic molecules is determined by several factors including the sizes of the organic molecules, the interaction properties among the organic molecules, and the interaction properties between the organic molecules and the substrate (e.g., a magnetic layer) on which the self-assembly year is formed, derivatization of organic molecules can adjust the tunneling channel density on the middle layer.

In still another embodiment of the method, derivatizing of an organic molecule optimizes the process of forming the middle layer by tuning properties such as the solubility, monolayer forming capability, sublimation temperature, etc., of the organic molecule. For instance, when selected organic molecules have alkyl chains between a phenol and a thiol on each side, derivatives having longer alkyl chains tend to have a better solubility.

A wide range of organic molecules is suitable for the present invention. As previously discussed, the organic molecule can be an insulator, a semiconductor or a conductor, depending on the characteristics of the magnetoresistive element (10, 20, 30, 40 or 70). The exemplary organic molecules suitable for the inventive magnetoresistive element and the method of making the same include, but are not limited to: fullerenes such as buckminsterfullerene ($C_{60}$) and their derivatives such as K doped fullerenes (e.g., $K_xC_{60}$); conjugated hydrocarbon or heterocyclic organic polymeric semiconductor materials such as oligomers of polyacenes, polythiophenes, polyacetylene, polydiacetylene, polyphenylenes, polyvinylene, polyaniline, polypyrrole, polyfuran, polypyridine, polythienylene, and the derivatives thereof including oligomers of those conjugated organic polymers; condensed aromatic hydrocarbons such as tetracene, chrysene, pentacene, pyrene, perylene, coronene, and the derivatives of those condensed aromatic hydrocarbons; and metal complexes of porphine and phthalocyanine type of compounds such as zinc 1,10,15,20-tetraphenyl-21 H, 23 H-porphine, copper phthalocyanine, lutetium bisphthalocyanine, aluminum phthalocyanine chloride.

Various methods for forming molecules layers such as monolayers can be used to form the middle layer (e.g., 46 or 76) in accordance with the present invention. These methods include re-sublimation, low temperature vacuum evaporation, spin-coating, solvent charge transfer interaction, and electro-deposition.

Re-sublimation techniques are particularly suitable for forming a molecular monolayer, as previously illustrated in FIGS. 5 and 6. In re-sublimation method, after initial deposition Oman organic material film, the formation of a single monolayer of organic material can be facilitated by resubliniing the film. The success of re-sublimation is relatively independent of the exact thickness of the initially deposited film, making the method advantageous compared to conventional deposition techniques. In conventional deposition techniques, a multilayer film is first deposited. This requires stringent control of the initial multiple layer film's minimal thickness. For appropriate choices of organic materials and underlying metal substrate, it has been demonstrated that an ionic or charge transfer bond is formed between the first layer of the organic multilayer and the underlying metal substrate, as in the case for Cu and $C_{60}$ (Ku-Ding Tsuei et al., Physical Review B, 52, No. 23, 1997, pp. 15412-15420.). The bonding between the subsequent layers of the organic multilayer, however, is much weaker, as they may be due solely to van der Waals forces. Heating the entire substrate and film under vacuum can then lead to a dissociation of the weak van der Waals bonds without disrupting the bonding between the first organic layer and the underlying metal substrate. Through this process, the initial multilayer film is re-sublimed away from the substrate, leaving only a monolayer film. Rather than attempting to finely control the original amount of material incident upon the substrate, simple thermal cycling can afford precise monolayer deposition capability.

Low temperature vacuum evaporation of organic molecules is another choice of methods for forming the middle layer (e.g., 46 in FIG. 4 or 76 in FIG. 7) in accordance with the present invention. In this method, a conventional physical vapor deposition (PVD) process is used to form the underlying metallic layers including the substrate layer. Thereafter, a molecular multilayer of an organic material is deposited onto the substrate, by using low temperature thermal evaporation process. To do this, an original charge of the organic material is placed into a heated crucible and is heated to a temperature at which the vapor pressure of the organic material corresponds to a substantial deposition rate on the substrate as the substrate is exposed to an outgoing beam of the organic molecules leaving the crucible. The charge of the organic material is typically held behind either a shutter or within a confined cell until the deposition starts. As the organic molecules leave the crucible containing the original charge, they travel through a low pressure chamber and are deposited on the substrate. Deposition can either be stopped at a controlled time, or, if a feedback system such as a quartz crystal microbalance is used, after a designated amount of material is seen to be deposited on a reference situated near the substrate in the chamber. Upon completion of the organic material deposition, conventional deposition processes are used to complete the fabrication of a complete magnetoresistive element, and further fabrication of a functional magnetoresistive sensor or magnetoresistive stack (such as a TMR stack using a read head.)

The low temperature vacuum evaporation of organic molecules as described above is beneficial in several regards. First, because organic material(s) can be chosen or designed to pack cleanly and tightly in ordered layers, the sticking coefficient (and binding energy) of an incident molecule on a growing film will depend upon the structure of that film. If the film is ordered, and has formed a discrete number of complete monolayers, the subsequent incident molecules will be more likely to bounce back from the film due to a low binding energy between the incident molecules and such a film. In contrast, if an incomplete monolayer is present, the incident molecules are more likely to stick on the incomplete monolayer. For process control purposes, this implies that in contrast to the continuous growth of a conventional inorganic disordered film (e.g., a conventional TMR barrier), the thickness of an organic TMR barrier film is likely to increase discontinuously, jumping from one discrete thicknesses to the next with an increment of a single molecule layer (monolayer). Consequently, it is possible to terminate the deposition process relatively precisely within a period of time between two adjacent monolayer jumps in which no film is effectively deposited, thus allowing for greater process control to make a multilayer of a controlled number of discrete layers. In contrast, in conventional TMR stacks, although the thickness of the TMR barrier layer has been reduced to only several molecular layers, the barrier layer is a molecular multilayer only in an average sense due to the existence of incomplete layers. In fact, conventional film thickness is often measured in non-integer multiples of a number of monolayers (for instance, 2.5 monolayers of $Al_2O_3$, meaning the film is 2.5 layers thick on average, but different regions may be either thicker or thinner.)

Second, using low temperature vacuum evaporation of organic molecules in accordance with the present invention, even if a fractional layer is present upon terminating the deposition, the fractional layer is likely to be loosely bound, and therefore can be removed with small temperature cycling.

Additionally, the process of re-sublimation as previously described may be used to completely remove any additional layers beyond the first layer.

Spin-coating is yet another technique available for making organic middle layers in accordance with the present invention. Rather than using the preferred method of vacuum deposition of the organic middle layer, organic materials can be held in solvent and controllably cast upon a substrate. By depositing a solution on top of a substrate, and then rotating the substrate at a high speed, the solvent deposits the organic material solute on the substrate in a controlled fashion. If the elected organic material is of sufficiently low resistance, this may be the only necessary step in depositing a middle layer such as a barrier layer. Alternatively, the barrier layer may also be subsequently re-sublimed to remove all of the spin-coated material except for the first monolayer.

In addition, electrodeposition may be used to make a discrete molecular layer(s) of an organic material as a middle layer in accordance with the present invention. Using electrodeposition, an organic material held in solution can be deposited as an organic film upon a conductive substrate by cycling the voltage of the substrate relative to the solution and counterelectrodes. Because of the conductivity of the organic film and the bonding of the organic molecules to the organic film are different from that of a bare electrode, the electrodeposition process can be conducted in a fashion such that the deposition of a film terminates controllably after one monolayer of the organic molecules has been formed. Alternatively, if more than one monolayer is deposited, re-sublimation may be used to remove the excess layers.

Although the present invention has been described with reference to preferred embodiments, workers skilled in the art will recognize that changes may be made in form and detail without departing from the spirit and scope of the invention.

The invention claimed is:

1. A magnetoresistive element comprising:
a first magnetic layer;
a second magnetic layer; and
a middle layer disposed between the first and the second magnetic layers, wherein the middle layer is thinner than 5 nm (50 Å) and comprises organic molecules, and wherein the magnetoresistive element exhibits a magnetoresistive effect as a function of the relative alignment of magnetizations of the first and the second magnetic layers, wherein the middle layer comprises at least one molecular monolayer.

2. The magnetoresistive element of claim 1, wherein the organic molecules are semiconductive.

3. The magnetoresistive element of claim 1, wherein the organic molecules are intrinsically semiconductive even when not in contact with the first and second magnetic layers.

4. The magnetoresistive element of claim 1, wherein the middle layer defines a main plane and the magnetoresistive effect is observed with respect to a current in a direction perpendicular to the main plane of the middle layer.

5. The magnetoresistive element of claim 1, wherein the magnetoresistive effect is at least partially contributed by a GMR effect.

6. The magnetoresistive element of claim 1, wherein the magnetoresistive effect is at least partially contributed by a TMR effect.

7. The magnetoresistive element of claim 1, wherein the middle layer comprises substantially the organic molecules only, and wherein the organic molecules are substantially uniformly distributed across the middle layer.

8. The magnetoresistive element of claim 1, wherein the first magnetic layer has a fixed orientation of magnetization, and the second magnetic layer has an orientation of magnetization which varies in accordance with an external magnetic signal from a data storage medium used in a data storage such as a hard disc drive.

9. The magnetoresistive element of claim 1, wherein the middle layer is formed using a technique or a combination of techniques selected from the group consisting of re-sublimation, low temperature vacuum evaporation, spin-coating, and electro-deposition.

10. The magnetoresistive element of claim 1, wherein the molecular monolayer has a tightly-packed arrangement among all molecules thereof including the organic molecules.

11. The magnetoresistive element of claim 1, wherein the monolayer is a self assembled layer.

12. The magnetoresistive element of claim 1, wherein the middle layer is in direct contact with at least one of the first and the second magnetic layers.

13. The magnetoresistive element of claim 12, wherein the direct contact is a charged-transfer bond.

14. The magnetoresistive element of claim 1, wherein the middle layer comprises a first molecular layer and a second molecular layer, the first and the second molecular layers being different in molecular composition.

15. The magnetoresistive element of claim 1, wherein the middle layer comprises a first molecular layer and a second molecular layer, the first and the second molecular layers being different in molecular composition in that the second molecular layer comprises at least one type of molecules that is not found in the first molecular layer.

16. The magnetoresistive element of claim 1, wherein the organic molecules exhibit a substantially isotropic electron transport property.

17. The magnetoresistive element of claim 1, wherein the organic molecules are selected from the group consisting of fullerenes such as buckminsterfullerene ($C_{60}$) and derivatives thereof including K doped fullerenes; conjugated hydrocarbon or heterocyclic organic polymeric semiconductor materials such as oligomers of polyacenes, polythiophenes, polyacetylene, polydiacetylene, polyphenylenes, polyvinylene, polyaniline, polypyrrole, polyfuran, polypyridine, polythienylene, and derivatives thereof including oligomers of those conjugated organic polymers;
condensed aromatic hydrocarbons such as tetracene, chrysene, pentacene, pyrene, perylene, coronene, and derivatives of those condensed aromatic hydrocarbons; and metal complexes of porphine and phthalocyanine type of compounds such as zinc 1,10,15,20-tetraphenyl-21 H, 23 H-porphine, copper phthalocyanine, lutetium bisphthalocyanine, aluminum phthalocyanine chloride.

18. A magnetoresistive element comprising:
a first magnetic layer;
a second magnetic layer; and
a tunneling barrier layer disposed in a stack between the first and the second magnetic layers, wherein the tunneling barrier layer comprises organic molecules, and wherein the magnetoresistive element exhibits a magnetoresistive effect as a function of the relative alignment of magnetizations of the first and the second magnetic layers, wherein the tunneling barrier layer defines a main plane and the magnetoresistive effect is observed with respect to a current flowing through the stack in a direction perpendicular to the main plane of the tunneling barrier layer.

19. The magnetoresistive element of claim 18, wherein the tunneling barrier layer is a molecular monolayer.

20. The magnetoresistive element of claim 18, wherein the molecular monolayer has a tightly-packed arrangement among all molecules thereof including the organic molecules.

21. The magnetoresistive element of claim 18, wherein the monolayer is a self-assembled layer.

22. The magnetoresistive element of claim 18, wherein the tunneling barrier comprises a plurality of molecular monolayers.

23. A magnetoresistive element comprising:
a first magnetic layer;
a second magnetic layer disposed parallel to and above the first magnetic layer; and
a middle layer disposed parallel to and between the first and the second magnetic layers, wherein the middle layer comprises organic molecules, wherein the magnetoresistive element exhibits a magnetoresistive effect as a function of the relative alignment of magnetizations of the first and the second magnetic layers, wherein the middle layer defines a main plane and the magnetoresistive effect is observed with respect to a current in a direction perpendicular to the main plane of the middle layer.

24. The magnetoresistive element of claim 23, wherein the organic molecules are semiconductive.

25. The magnetoresistive element of claim 23, wherein the middle layer is a molecular monolayer.

* * * * *

UNITED STATES PATENT AND TRADEMARK OFFICE
CERTIFICATE OF CORRECTION

PATENT NO.         : 7,248,446 B2
APPLICATION NO. : 10/306384
DATED              : July 24, 2007
INVENTOR(S)       : Eric L. Granstrom It is certified that error appears in the above-identified patent and that said Letters Patent is hereby corrected as shown below:

On the title Page item [56]: under References Cited for Pat. No, 5,862,022, delete "362/113" insert --360/13--

Column 1, Line 45, delete "Oman", insert --of an--

Column 4, Line 10, delete "Oman", insert --of an--

Column 10, Line 39, delete "tightlybound", insert --tightly bound--

Column 13, Line 6, delete "delivatizing", insert --derivatizing--

Column 13, Line 58, delete "Oman", insert --of an--

Column 13/14, Line 59/60, delete "resublining", insert --resubliming--

Signed and Sealed this

Thirteenth Day of November, 2007

JON W. DUDAS
*Director of the United States Patent and Trademark Office*